(12) United States Patent
Joseph

(10) Patent No.: US 7,424,722 B2
(45) Date of Patent: Sep. 9, 2008

(54) METHOD AND SYSTEM FOR CREATING A DYNAMIC OGSI SERVICE PROXY FRAMEWORK USING RUNTIME INTROSPECTION OF AN OGSI SERVICE

(75) Inventor: Joshy Joseph, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 937 days.

(21) Appl. No.: 10/652,803

(22) Filed: Aug. 29, 2003

(65) Prior Publication Data

US 2005/0050299 A1    Mar. 3, 2005

(51) Int. Cl.
*G06F 13/00*    (2006.01)

(52) U.S. Cl. .................. 719/330; 719/331; 719/332; 709/201; 709/203; 709/217; 709/219

(58) Field of Classification Search ............... 719/330, 719/331, 332; 709/201, 203, 217, 219
See application file for complete search history.

(56) References Cited

U.S. PATENT DOCUMENTS

| | | | | |
|---|---|---|---|---|
| 6,157,960 | A | 12/2000 | Kaminsky et al. | 709/303 |
| 6,182,155 | B1 | 1/2001 | Cheng et al. | 709/315 |
| 6,230,160 | B1 | 5/2001 | Chan et al. | 707/103 |
| 6,385,661 | B1 | 5/2002 | Guthrie et al. | 709/316 |
| 6,487,607 | B1 | 11/2002 | Wollrath et al. | 709/330 |
| 6,542,908 | B1 | 4/2003 | Ims | 707/204 |
| 2002/0013827 | A1* | 1/2002 | Edstrom et al. | 709/219 |
| 2002/0092000 | A1 | 7/2002 | Srinivasan et al. | 717/136 |
| 2002/0143641 | A1 | 10/2002 | Thomas et al. | 705/26 |
| 2002/0188666 | A1 | 12/2002 | Lemon et al. | 709/203 |
| 2003/0056023 | A1 | 3/2003 | Cole et al. | 709/315 |
| 2003/0056030 | A1 | 3/2003 | Gao et al. | 709/330 |
| 2003/0061299 | A1 | 3/2003 | Brown et al. | 709/214 |
| 2003/0069969 | A1 | 4/2003 | Renaud | 709/225 |
| 2003/0236924 | A1* | 12/2003 | Auffret et al. | 709/318 |
| 2004/0028031 | A1* | 2/2004 | Valin et al. | 370/352 |
| 2004/0123232 | A1* | 6/2004 | Hodges et al. | 715/513 |
| 2007/0038762 | A1* | 2/2007 | Moerdijk | 709/229 |

OTHER PUBLICATIONS

M. Atkinson, R. Baxter, and N. C. Hong; "Grid Data Access and Integration in OGSA;" National e-Science Centre; The University of Edingurg.

(Continued)

*Primary Examiner*—Andy Ho
(74) *Attorney, Agent, or Firm*—Cantor Colburn LLP; William A. Kinnaman, Jr.

(57) ABSTRACT

A method and system for creating a dynamic client side service proxy framework using meta-data and introspection capabilities of Open Grid Services Architecture (OGSA) service data is disclosed. The system and method include defining an Open Grid Service Invocation Factory configured to create a service proxy and introspecting an Open Grid Service Infrastructure (OGSI) service based on information exposed by the service. An OGSI Service Invocation Proxy is created defining a set of dynamic interfaces based on service introspection and a meta-data inspection interface of the Service Invocation Proxy. The Service Invocation Proxy exposes both static port type interfaces and dynamic interfaces to support more flexibility of the client.

14 Claims, 2 Drawing Sheets

OTHER PUBLICATIONS

I. Foster, C. Kesselman, J. M. Nick, and S. Tuecke; "The Physiology of the Grid: An Open Grid Services Architecture for Distributed Systems Integration".

M. Govindaraju, S. Krishnan, K. Chiu, A. Slominski, D. Gannon, and R. Bramley; "Merging the CCA Component Model with the OGSI Framework;" Department of Computer Science, Indiana University.

A. Krause, S. Malaika, G. McCance, J. Magowan, N. W. Paton, and G. Riccardi; "Grid Database Service Specification;" Oct. 2002; Global Grid Forum.

J. Unger and M. Haynos; "A Visual Tour of Open Grid Services Architectures".

\* cited by examiner

METHOD AND SYSTEM FOR CREATING A DYNAMIC OGSI SERVICE PROXY FRAMEWORK USING RUNTIME INTROSPECTION OF AN OGSI SERVICE

BACKGROUND

The present invention relates generally to web services and more particularly, to a method and system for creating a dynamic Open Grid Service Infrastructure (OGSI) service proxy framework using runtime introspection on an OGSI service.

Web services are defined as independently operated applications that are implemented over the Internet and which allow disparate systems to interact via common specifications and protocols. Existing Web services are still in their infancy stage. To date, there is no universally-accepted standard that would allow business enterprises to realize the full potential of Web services.

One type of Web service that is breaking ground is grid computing which involves bringing together numbers of heterogeneous computing devices resulting in a virtual organization (VO) whereby processing cycles and other resources can be shared for implementing complex functions.

The Open Grid Services Architecture (OGSA) is a grid system architecture based on an integration of Grid and Web services concepts and technologies. It includes a community-based set of services and software libraries for providing security, information infrastructure, resource management, data management, communication, fault detection, and portability functions. OGSA utilizes Web Services Description Language (WSDL), an XML-formatted language, to describe a Web service's capabilities for exchanging messages. OGSA includes WSDL interfaces, conventions, and service bindings that define the components required for creating complex distributed systems, such as lifetime management, change management, and notification, as well as for supporting security features. Utilizing WSDL, the OGSA architecture defines extensions to web services that specify properties for grid applications. These extensions, and their definitions in the OGSA specification, seek to provide a standard for technology such as portType relationships and serviceData in order to ensure interoperability among running grid services.

The OGSI (Open Grid Service Infrastructure) services exposes service specific meta-data and state data (e.g., relating to the schema of the database) through the OGSI service data framework and provides a common interface (FindServiceData) for accessing these service data through a 'GridService' interface. The meta-data about a service is exposed as service data elements through the service's mandatory interface called GridService portType. The information exposed through this interface is helpful for service introspection and semantic inferences on a particular service. The OGSA specification suggests using these introspection mechanisms for better coherence with the service implementation and for the correct runtime behavior rather than binding to some predefined and static definitions (including predefined WSDL definitions and service data element definitions about service). This assumption is based on the assumed GRID service behavior where a service can dynamically add service data elements and change its Grid service reference (GSR) information during its existence. Unlike a Grid service handle (GSH), which is invariant, the GSR(s) for a Grid service instance can change over that service's lifetime. When factories are used to create a new instance of a grid service, the factory returns the identity of the new instantiated service. This identity is composed of two parts, a GSH and a GSR. A GSH is guaranteed to reference the grid service indefinitely, while a GSR can change within the grid services lifetime.

The irony of OGSA is that, although meant to address a dynamic, distributed, on demand, 'utility' style of computing (i.e., grid computing), no provision is made for dynamically employing service provided meta-data and introspection capabilities of the service, thus maximizing flexibility of the client by eliminating a need for any pre-assumed programming artifacts, and at the same time, being in sync with the service provided information model and capabilities.

What is needed, therefore, is a way to improve the web service by defining a grid service that can enable a dynamic client side service proxy framework that utilizes the service provided meta-data and introspection capabilities of grid services.

SUMMARY

The foregoing discussed drawbacks and deficiencies of the prior art are overcome or alleviated by a. In an exemplary embodiment, a method for creating a dynamic client side service proxy framework using meta-data and introspection capabilities of Open Grid Services Architecture (OGSA) service data is disclosed. The method includes defining an Open Grid Service Invocation Factory configured to create a service proxy; introspecting an Open Grid Service Infrastructure (OGSI) service based on information exposed by the service; and creating an OGSI Service Invocation Proxy defining a set of dynamic interfaces based on service introspection and a meta-data inspection interface of the Service Invocation Proxy; wherein the Service Invocation Proxy exposes both static port type interfaces and dynamic interfaces to support more flexibility of the client.

In another aspect, a system for creating a dynamic client side service proxy framework using meta-data and introspection capabilities of Open Grid Services Architecture (OGSA) service data is disclosed. The system includes a grid client; a defined Open Grid Service Invocation Factory configured to create a service proxy; an Open Grid Service Infrastructure (OGSI) service in communication with the grid client via a communications network, the OGSI service includes OGSI service based information exposed by the service and introspected by the Factory; and an OGSI Service Invocation Proxy defining a set of dynamic interfaces based on the service introspection and a meta-data inspection interface of the Service Invocation Proxy; wherein the Service Invocation Proxy exposes both static port type interfaces and dynamic interfaces to support more flexibility of the client.

BRIEF DESCRIPTION OF THE DRAWINGS

Referring to the exemplary drawings wherein like elements are numbered alike in the several Figures.

DETAILED DESCRIPTION

OGSA facilitates grid services by providing a set of well-defined interfaces and by following specific conventions. The interfaces address discovery, dynamic service creation, lifetime management, notification, and manageability; the conventions address naming. Grid services also address authorization and concurrency control. This core set of interfaces facilitates the construction of hierarchical, higher-order services that can be treated uniformly across layers of abstraction.

A portType is an interface that defines a grid service. A portType inheritance allows the interfaces described using WSDL portType definitions to be aggregated via inheritance; that is, a portType may inherit operations and definitions from other portTypes. Associated with each interface is a set of service data elements that provide a standard representation for information about Grid service instances. Service data refers to OGSI-defined extensibility elements within WSDL portTypes to define data and data types using XML and XML schema syntax. This data and associated type information is used to expose the detailed state information associated with the service at runtime. A user can implement a particular Grid service as defined by its interfaces and associated service data elements and host it in different environments.

Grid services can maintain internal state for their lifetime. The existence of state distinguishes one instance of a service from another instance that provides the same interface. The term Grid service instance refers to a particular instantiation of a Grid service.

Because Grid services are dynamic and stateful, they must be distinguished from one another. This is accomplished via a globally unique name, the Grid service handle (GSH).

OGSA defines the semantics of a Grid service instance: how it is created and named, has its lifetime determined, and communication protocols selected. OGSA does not, however, place requirements on what a service does or how it performs that service. OGSA does not address issues such as the implementation programming model, programming language, implementation tools, or execution environment. A specific execution or hosting environment instantiates Grid services. A hosting environment defines not only the implementation programming model, programming language, development tools, and debugging tools, but also how a Grid service implementation meets it obligations with respect to Grid service semantics. Container- or component-based hosting environments such as J2EE, Websphere, .NET, and Sun ONE can implement Web services such as a grid service and offer superior programmability, manageability, flexibility, and safety.

Figure 1:
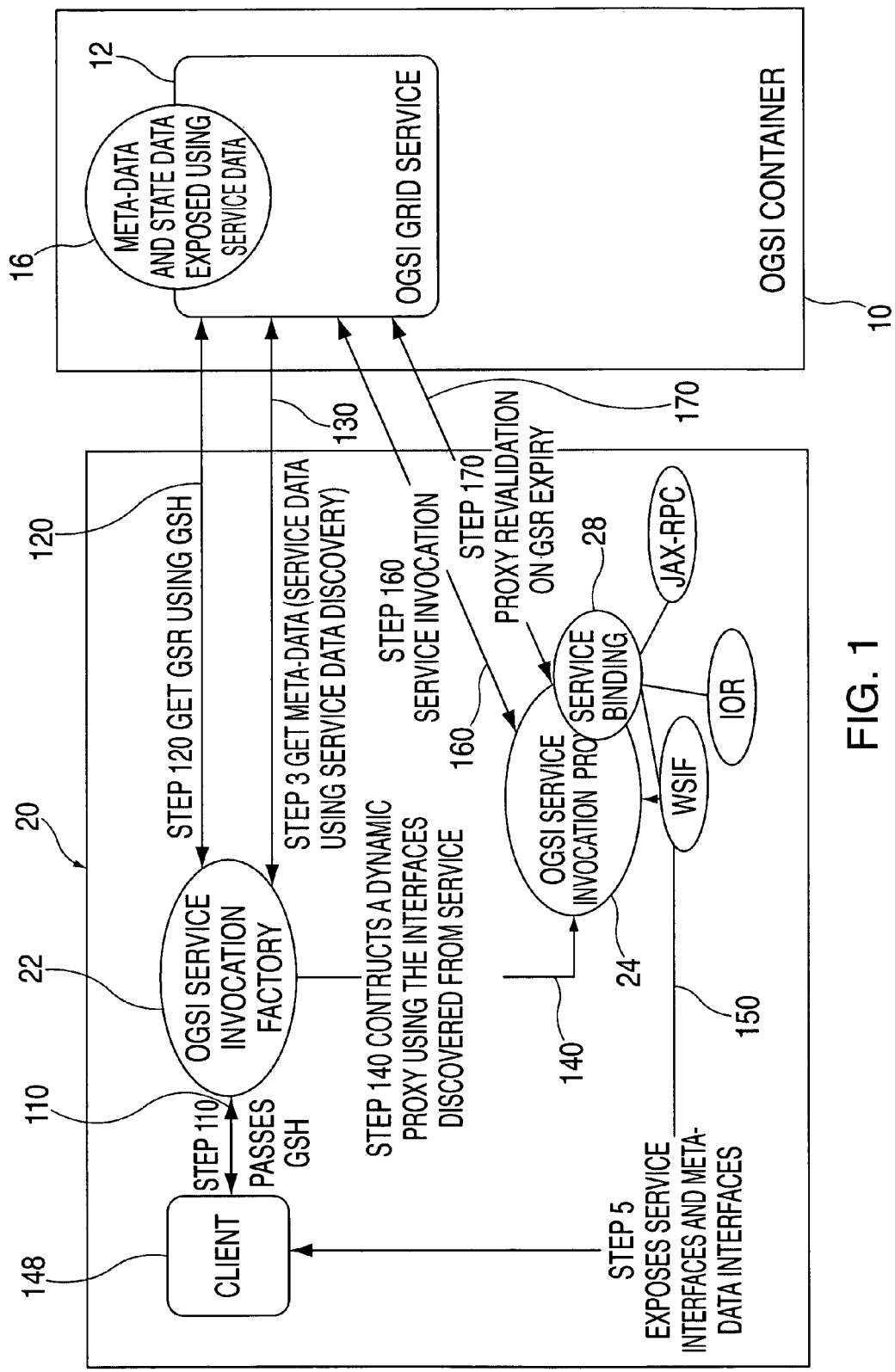
FIG. 1 is a block diagram of a system upon which the grid services dynamic client side service proxy framework is implemented in an exemplary embodiment.

Referring to FIG. 1, a container 10 has primary responsibility for ensuring that the services 12 it supports adhere to Grid service semantics and for offloading some service responsibilities from the service implementer.

Client systems 14a-14n (only one shown) execute client applications including requests for grid services 12. Client systems 14a-14n each comprise a web-enabled processing device such as a general purpose computer, laptop or mobile computing instrument and execute various client applications such as word processing, spreadsheet, analytical, or other similar types software programs known in the art. Although not shown, client systems 14a-14n may be part of a larger network of computer devices and connected via suitable networking infrastructures and technologies such as Intranet, Wide Area Network, and wireless Wi-Fi technologies. For purposes of illustration and simplification, client systems 14a-14n are stand alone, independent entities connected to the Internet.

Here, a dynamic client side service proxy framework is proposed utilizing service provided meta-data and introspection capabilities. The information that is exposed by the service through its service data elements help design a client with maximum flexibility without any pre-assumed programming artifacts while at the same time is in sync with the service provided information model and capabilities.

Some of the information that are exposed by the Grid service through its service data elements are:
1. The names of all the statically defined service data and a possible set of dynamically defined service data;
2. All of the interfaces (portTypes) the service is implementing with a minimum of the GridService portType interface;
3. All possible GSR's about the service, wherein a WSDL GSR is required;
4. All possible GSH's (0 or more), there may be handles to the service not included here and there is an assumption of possessing a GSH to locate this service;
5. Factory locator with the details (GSH's, GSR's of the factory and portTypes the factory implements) of the factory that created this service, there can be a null locator which assumes that no factory is associated with the service;
6. To support extensibility operations on GridService's FindServiceData, a set of possible input elements, its semantics and return values;
7. To support extensibility operations on GridService's SetServiceData's possible input elements for update, update semantics and return values; and
8. Current termination time set for this service.

The present disclosure proposes a dynamic client side service proxy framework 20 utilizing the above service 12 provided meta-data and introspection capabilities. This framework 20 defines an OGSI service invocation factory (OSIFactory) 22 that is capable of creating a service invocation proxy (as described below) by introspecting the OGSI service 12 based on information 16 exposed by the service 12 including the service data elements, port types, GSR values, and operation extensibility parameters. Framework 20 further includes an OGSI service invocation Proxy (OSIProxy) 24 which defines a set of dynamic interfaces based on the service introspection (a minimum of Grid Service port type) and its own meta-data inspection interface (OSIProxyMetaData) which provides inspection features on a service like the port types (interfaces) it is implementing, static and dynamic service data types, its queries (QNames) and language specific types, and the like. The service proxy 24 exposes both static port type interfaces (as defined in the port type or service interface) and dynamic interfaces (a common set of programming patterns) for more flexibility.

Furthermore, in order to support the above described dynamic interface model, framework 20 also provides binding choices 28 based on the GSR (Grid Service Reference) binding encoding information (hidden from the client 14a). This GSR encoding can be WSDL, IOR, WSIF, JAX-RPC, or the like. Each of these encodings can support multiple transport binding information (SOAP/HTTP or SOAP/JMS, for example). These bindings 28 are constructed on the fly by introspecting the GSR available from the service 12.

Other features supported by the OGSI Service Invocation Proxy 24 include:
1. Dynamic refreshing of the proxy 24 based on the GSR life time information;
2. Creation of a service data 'language types' from XML schema types at runtime;
3. A pass through interface mechanism for web service call properties like security and other information;
4. A caching mechanism for service types and GSR framework;
5. Enabling better performance through utilization of caching and avoiding round-trips to service 12; and 6. An introspection mechanism on the service calls to support common programming 'aspects' (as defined by Aspect Oriented Programming concepts).

Figure 2:
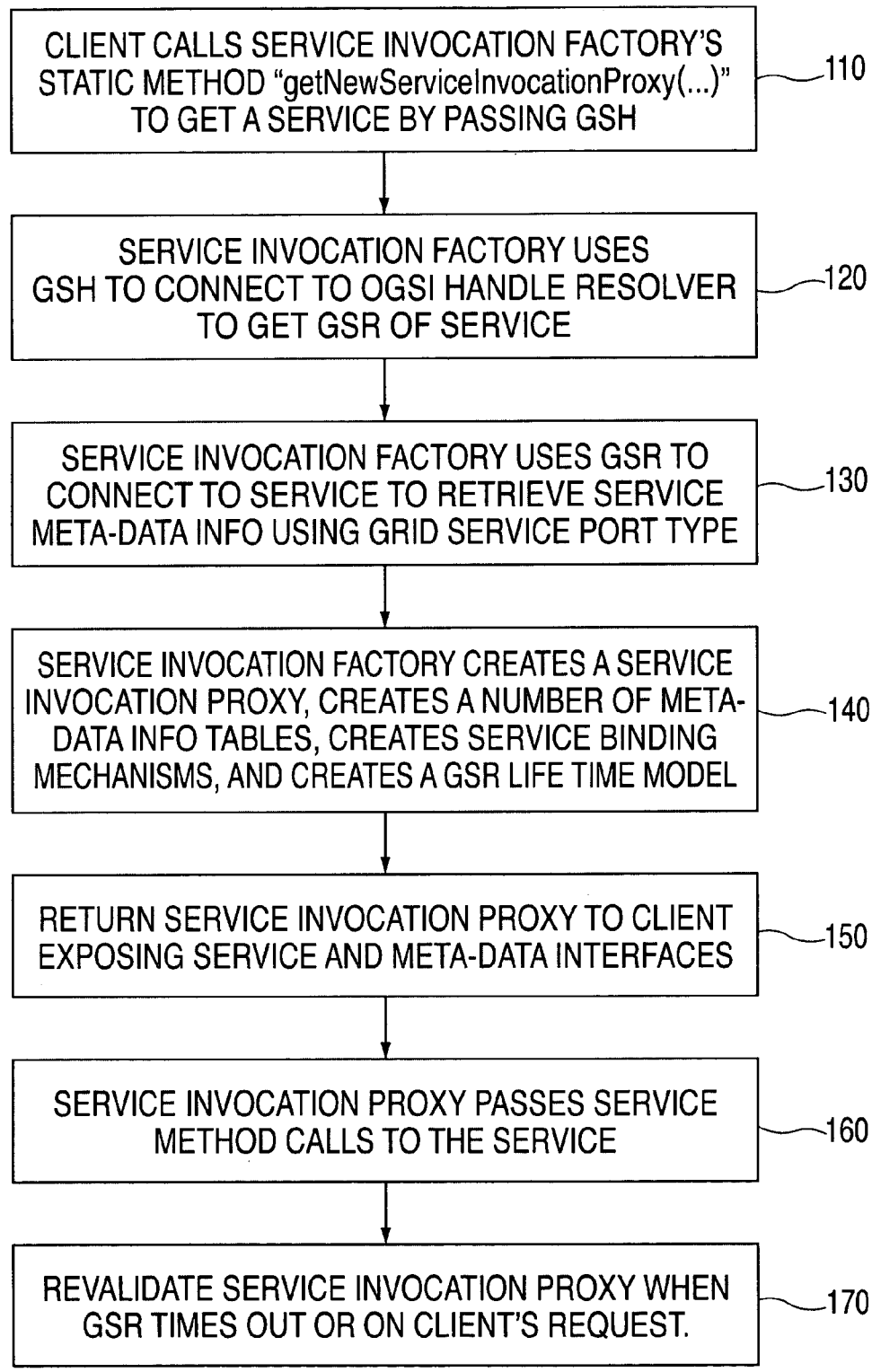
FIG. 2 is a flowchart describing the process of implementing the grid services dynamic client side service proxy framework in an exemplary embodiment.

Referring to FIGS. 1 and 2, a client side implementation model based on the J2EE 1.3 Java Proxy framework is described below. However, it will be recognized by one skilled in the pertinent art that this model is not intended to be limited to Java. It will be also noted that the same proxy framework can be created using any dynamic proxy supported platforms and languages (e.g., Microsoft .NET supported proxy framework can be used; provided through the .NET Remoting framework).

Once the client 14a gets access to an OGSI GRID service handle (GSH) through a mechanism like discovery from a registry (not shown), the client 14a can construct a dynamic proxy 24 using that handle. No further information is needed to construct the service proxy framework 20.

There are a number of steps involved before a client can get a service invocation proxy 24 with reference to FIGS. 1 and 2. First at step 110, the client 14a calls a static method "getNewServiceInvocationProxy( . . . )" of service factory 22 to get a service proxy by passing the GSH of the service 12 and the service location information 16 (hosting information). The OSI invocation factory 22 uses this GSH and connects to the OGSI hosting environment's Handle Resolver to get the GSR of the service 12 at step 120. Then at step 130, the OSI invocation factory 22 uses the GSR (OGSI requires at least one GSH and one GSR) to connect to the service 12 to retrieve its meta-data information 16 using the GridService portType, which is a mandatory interface for all GRID services. This call retrieves all the service data associated with the service 12 using the "FindServiceData" method. Step 130 is an iterative process and retrieves all of the service data defined in the service 12 and other relevant information including interface, GSR(s), GSH(s), Queries, termination time, and the like.

After retrieving all the necessary information, at step 140 the OSI invocation factory 22 creates a proxy using the exposed interfaces (assuming that these interfaces are present; otherwise there may be a need to construct new Java classes with this interface definition information (dynamic compile)) and create a Java proxy 24 using an Invocation Handler interface as defined by Java language. Next, the OSI invocation factory 22 creates a number of meta-data information tables with: (1) Exposed Service data information and its corresponding types based on semantic and Java type and XML type information, (2) Exposed interfaces and methods, and (3) Exposed Extensibility parameter types and methods, for example.

Next, the OSI invocation factory 22 creates a service binding and service transport binding mechanisms shown generally at 28 using existing mechanisms including, but not limited to, JAX-RPC, WSIF, and CORBA IOR, for example. In addition, OSI invocation factory 22 creates a GSR lifetime model so that it can refresh the service binding 28 on GSR available time termination.

At block 150, the proxy 24 is returned to the client 14a (with a minimum of two interfaces) including: (1)Grid Service portType and (2) Service Proxy meta-data interface with information about service meta-data. The client 14a may cast this proxy to which ever interface the client 14a wants to invoke the call on the service 12. For example, client 14a can cast the proxy 24 to NotificationSource portType (not shown) and can invoke methods on that interface. Framework 20 also provides a dynamic interface where the client 14a can construct a call dynamically using the port type name, method name and parameters similar to WSIF and DII.

At block 160, the service proxy 24 passes the service method calls to the service 12. When the GSR times out or on the clients request, a service proxy 24 will revalidate itself at block 170. This revalidation can result in interface changes and service data information changes. Proxy 24 tries to optimize these changes based on the available information 16 and cached values.

The above described exemplary embodiment provides the following advantages:

1. Client gets a real time proxy to a service instance;
2. Client is free from the GSR encoding and static stubs generation;
3. The proxy can select a binding through a number of negotiations (e.g., static and dynamic negotiation) without a client's involvement;
4. No need to worry about GSR expiration and invalidation, as the proxy handles the same internally (e.g., the proxy is tied to the service life cycle model and service reference validity can change on reference invalidation);
5. Client is not bound to service interfaces, thus service can change the interfaces it implements (e.g., a dynamic service behavior);
6. Proxy can do a number of performance optimizations including client side caching;
7. Dynamic service data and semantic information associated with service data can be handled; and
8. Proxy pattern can provide common aspects (e.g., introspection on method calls and determining some common behaviors like security, transaction, logging, and the like).

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for creating a dynamic client side service proxy framework using meta-data and introspection capabilities of Open Grid Services Architecture (OGSA) service data, the method comprising:
- a grid client; defining an Open Grid Service Invocation Factory configured to create a service proxy;
- introspecting an Open Grid Service Infrastructure (OGSI) service based on information exposed by the service; and
- creating an OGSI Service Invocation Proxy defining a set of dynamic interfaces based on said service introspection and a meta-data inspection interface of said Service Invocation Proxy;
- wherein said Service Invocation Proxy exposes both static port type interfaces and dynamic interfaces to support more flexibility of the client; and
- wherein said OGSI service based information includes service data elements, port types, Grid Service Reference (GSR) values, and operation extensibility parameters.

2. The method of claim 1, wherein said dynamic interfaces include a minimum of a Grid Service port type.

3. The method of claim 1, wherein said Service Invocation Proxy provides inspection features on the service including at least one of: service implemented port types, static and dynamic service data types, Qnames, and language specific types.

4. The method of claim 1, wherein said static port type interfaces include at least one of a port type and service interface.

5. The method of claim 1, wherein said dynamic interfaces include a common set of programming patterns.

6. The method of claim 1, further comprising:
- binding choices based on said GSR values, the GSR values including binding encoding information that is hidden from the client.

7. The method of claim 6, wherein said binding encoding information includes Web Services Description Language (WSDL), WSIF, JAX-RPC and CORBA IOR.

8. The method of claim 7, wherein said binding encoding information is configured to support multiple transport binding information including SOAP/HTTP and SOAP/JMS.

9. The method of claim 1, further comprising;
- refreshing said Service Invocation Proxy based on GSR lifetime information.

10. The method of claim 1, wherein said framework further comprises creation of a service data language types from extensible markup language (XML) schema types at runtime.

11. The method of claim 1, wherein said framework further comprises a pass through interface mechanism for web service call properties including security, transaction, logging and other information.

12. The method of claim 1, wherein said framework further comprises a caching mechanism for service types and GSR framework.

13. The method of claim 12, wherein said caching mechanism optimizes performance by avoiding round-trips to the service.

14. The method of claim 1, wherein said framework further comprises an introspection mechanism on service calls configured to support common programming "aspects" as defined by Aspect Oriented Programming concepts.

* * * * *